US012639872B1

(12) United States Patent
Wright

(10) Patent No.: US 12,639,872 B1
(45) Date of Patent: **\*May 26, 2026**

(54) SYSTEMS AND METHODS FOR ANIMATION

(71) Applicant: Jay Wright, Eureka, CA (US)

(72) Inventor: Jay Wright, Eureka, CA (US)

(73) Assignee: ASSEMBLED LLC, Eureka, CA (US)

( \* ) Notice: Subject to any disclaimer, the term of this patent is extended or adjusted under 35 U.S.C. 154(b) by 77 days.

This patent is subject to a terminal disclaimer.

(21) Appl. No.: 18/412,472

(22) Filed: Jan. 13, 2024

Related U.S. Application Data

(63) Continuation-in-part of application No. 17/244,364, filed on Apr. 29, 2021, now Pat. No. 11,875,440, which is a continuation-in-part of application No. 15/932,441, filed on Feb. 5, 2018, now abandoned.

(51) Int. Cl.
| | |
|---|---|
| *G06T 15/00* | (2011.01) |
| *B33Y 50/00* | (2015.01) |
| *G06T 13/20* | (2011.01) |
| *G06T 17/00* | (2006.01) |

(52) U.S. Cl.
CPC .............. *G06T 13/20* (2013.01); *B33Y 50/00* (2014.12); *G06T 17/00* (2013.01)

(58) Field of Classification Search
CPC ....... G06T 19/00; G06T 15/005; G06T 17/20; G06T 17/00; G06T 15/10; G06T 15/00; G06T 13/40; G06T 15/06; G06T 15/08; G06T 15/20; G06T 15/04; G06T 2210/41; G06T 1/20; G06T 19/006; G06T 7/337; G06T 7/50; G06T 7/74; G06T 19/20; G06T 2200/04; G06T 2207/10016; G06T 2207/30244; G06T 2219/024; G06T 2219/2016; G06T 2210/12; G06T 2210/21; G06T 7/70; G06T 2207/20084; G06T 1/60; G06T 13/20; H04N 23/57; H04N 23/90; H04N 23/64; H04N 23/611; H04N 23/635; H04N 7/147; H04N 7/157; G06F 16/51; G06F 21/602; G06F 3/013; G06F 3/012; G06F 3/011; G06V 20/20; B33Y 50/00
USPC ........................................................ 345/419
See application file for complete search history.

(56) References Cited

U.S. PATENT DOCUMENTS

| | | | |
|---|---|---|---|
| 2008/0111816 A1* | 5/2008 | Abraham ............... | G06Q 30/06 345/420 |
| 2009/0118852 A1 | 5/2009 | Kumar et al. .................. | 700/98 |
| 2017/0181798 A1* | 6/2017 | Panescu ............. | G02B 23/2484 |

\* cited by examiner

*Primary Examiner* — Gordon G Liu
(74) *Attorney, Agent, or Firm* — Adibi IP Group, PC; Amir V. Adibi; Andrew C. Palmer

(57) ABSTRACT

A system for creating an animation including a non-transitory memory storing an executable code, a hardware processor executing the executable code to receive a first scene input including a plurality of scene elements from an input device, create a three-dimensional (3D) digital representation of each of the plurality of scene elements in the first scene input, transmit the 3D digital representation of the plurality of scene elements in the first scene input for physical production, receive a first scene capture depicting the physical 3D reproductions of the plurality of scene elements of the first scene input arranged to recreate the first scene input from a recording device, process the first scene capture for display, and transmit the first scene capture for display.

16 Claims, 2 Drawing Sheets

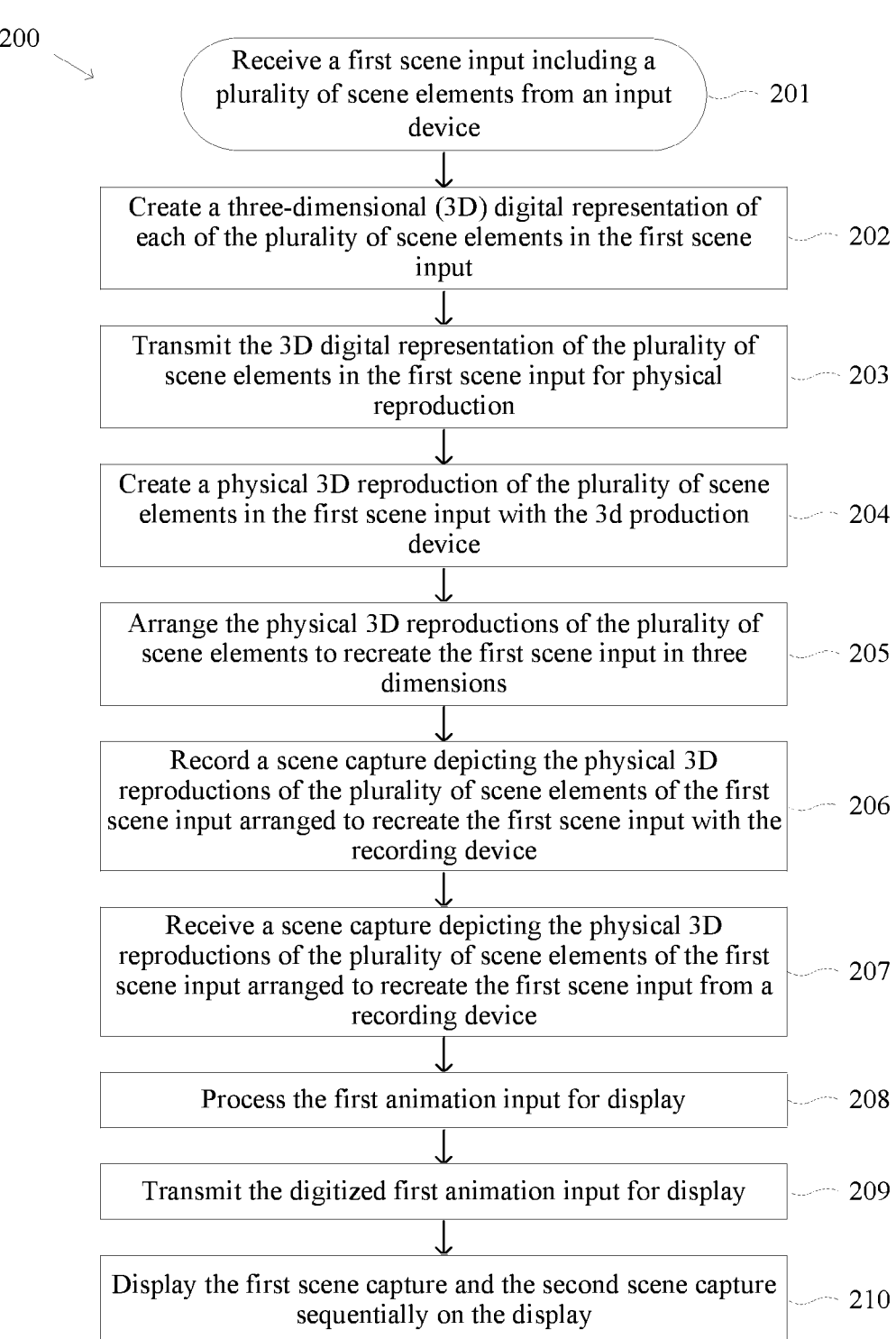

200

Receive a first scene input including a plurality of scene elements from an input device — 201

Create a three-dimensional (3D) digital representation of each of the plurality of scene elements in the first scene input — 202

Transmit the 3D digital representation of the plurality of scene elements in the first scene input for physical reproduction — 203

Create a physical 3D reproduction of the plurality of scene elements in the first scene input with the 3d production device — 204

Arrange the physical 3D reproductions of the plurality of scene elements to recreate the first scene input in three dimensions — 205

Record a scene capture depicting the physical 3D reproductions of the plurality of scene elements of the first scene input arranged to recreate the first scene input with the recording device — 206

Receive a scene capture depicting the physical 3D reproductions of the plurality of scene elements of the first scene input arranged to recreate the first scene input from a recording device — 207

Process the first animation input for display — 208

Transmit the digitized first animation input for display — 209

Display the first scene capture and the second scene capture sequentially on the display — 210

FIGURE 2

SYSTEMS AND METHODS FOR ANIMATION

CROSS REFERENCE TO RELATED APPLICATIONS

This application is a continuation-in-part of, and claims the benefit under 35 U.S.C. § 120 from, nonprovisional U.S. patent application Ser. No. 17/244,364, entitled "Systems And Methods For Animation," filed on Apr. 29, 2021. U.S. patent application Ser. No. 17/244,364, in turn, is a continuation-in-part of, and claims the benefit under 35 U.S.C. § 120 from Ser. No. 15/932,441, entitled "Virtualized Three Dimensional Animation Post-Production Technique For Motion Picture And Virtual Environments," filed on Feb. 5, 2018. The subject matter of each of the foregoing documents is expressly incorporated herein by reference.

TECHNICAL FIELD

The field of the invention relates to animation for motion pictures, industrial visualization and implementation, and virtual environments; specifically, the creation of individual and sets of animation cells or frames three-dimensional (3D) replication tools such as 3D printers, CNC (computer numerical control) machines and 3D relief machines.

BACKGROUND INFORMATION

There are many animation techniques for motion pictures, industrial visualization and implementation, and virtual environments. In general, there have been three types: (1.) direct manipulation of the motion picture stock, (2.) re-photographed drawings or (3.) computer signal output to digital two-dimensional (2D) motion picture photography, 3D virtual environment or printed back to stock. In recent years this has also included animation (computer and traditional 2D) output to virtual environments (virtualization) for many purposes: scientific, business, gaming or other. These motion picture and virtual manipulation techniques have been 2D (two-dimensional physical form) or virtual (only existing in digital form) i.e., no physical existence. The present invention seeks to provide a 3D process of animation for physical and virtual (digital) forms.

SUMMARY

In one implementation, the present disclosure includes a system for creating an animation including a non-transitory memory storing an executable code, a hardware processor executing the executable code to receive a first scene input including a plurality of scene elements from an input device, create a three-dimensional (3D) digital representation of each of the plurality of scene elements in the first scene input, transmit the 3D digital representation of the plurality of scene elements in the first scene input for physical production, receive a first scene capture depicting the physical 3D reproductions of the plurality of scene elements of the first scene input arranged to recreate the first scene input from a recording device, process the first scene capture for display, and transmit the first scene capture for display.

In some implementations, the system further comprises a 3D production device for producing 3D models of the 3D digital representation of the plurality of scene elements and a scene capture device and a recording device, wherein, after the hardware processor transmits the 3D digital representation, the hardware processor further executes the executable code to create a physical 3D reproduction of the plurality of scene elements in the first scene input with the 3d production device, and record a scene capture depicting the physical 3D reproductions of the plurality of scene elements of the first scene input arranged to recreate the first scene input with the recording device.

In some implementations, the 3D production device is one of an additive production device and a subtractive production device.

In some implementations, the hardware processor further executes the executable code to receive a second scene input including a plurality of second scene elements from the input device, create a three-dimensional (3D) digital representation of each of the plurality of second scene elements in the second scene input, transmit the 3D digital representation of the plurality of second scene elements in the second scene input for physical production, receive a second scene capture depicting the physical 3D reproductions of the plurality of second scene elements of the second scene input arranged to recreate the second scene input from the recording device, process the second scene capture for display, and transmit the second scene capture for display.

In some implementations, the system further comprises a display and the hardware processor further executes the executable code to display the first scene capture and the second scene capture sequentially on the display.

In some implementations, the input device is one of a still camera, a video camera, and a computer running a graphics program. In some implementations, the recording device comprises at least one of a still camera, a video camera, a 3D scanner, a tactile sensor system, an auditory sensor system, or a combination of any of the above sensor systems.

In other implementations involving a tactile sensor system, the tactile sensor system converts physical objects into an accurate 3D digital representation. In one example, the tactile sensor system includes a glove equipped with tactile sensors. The tactile sensors directly or indirectly detect objects. A user or robot wears the glove and contacts a physical object. The sensors capture detailed tactile information about the object's surface, including its texture, shape, and other physical properties to be captured as a digital representation for 3D printing. Embedded within the glove are numerous tactile sensors. These tactile sensors are capable of detecting various attributes of the object's surface, such as hardness, temperature, texture, penetrability, magnetic properties, optical properties (brightness, luminosity, gamma, or transparency, etc.). The tactile sensors generate sensor data indicative of the object's properties, dimensions, and/or features. The sensor data is then communicated to a computing device. The computing device is equipped with software that processes the sensor data and reconstructs a detailed 3D model of the object. The model can be rotated, scaled, and modified within the software or hardware, providing a 3D digital representation of the physical object in the scene.

In other implementations involving an auditory sensor system, the auditory sensor system includes a microphone array and a controller. The controller generates time of flight estimation information based on audio input received onto the microphone array. The controller uses the time of flight estimation information to form volumetric and motion elements that are 3D printable to form frames of an animation.

In some implementations, processing the first animation for display includes one of creating an animation by arranging the first scene capture with a plurality of other scene captures for sequential display and virtualizing the first scene capture for inclusion in a video game or other virtual user experience. For example, an animation producing entity uses this process in developing a video game, motion picture, animation, or virtual experience or environment.

BRIEF DESCRIPTION OF THE DRAWINGS

FIG. 2 shows a flow chart of an exemplary method for animation, according to one implementation of the present disclosure.

DETAILED DESCRIPTION

Figure 1:
FIG. 1 shows a diagram of a system for animation, according to one implementation of the present disclosure.
Figure 1:
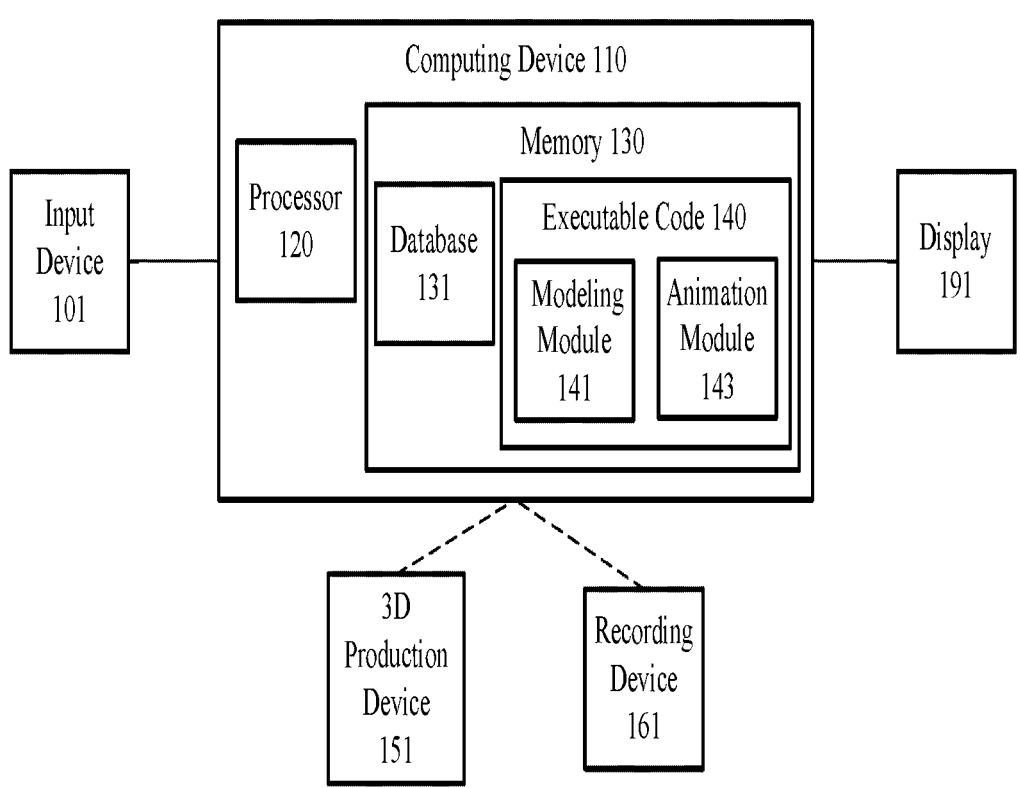

The following description contains specific information pertaining to implementations in the present disclosure. The drawings in the present application and their accompanying detailed description are directed to merely exemplary embodiments. Unless noted otherwise, like or corresponding elements among the figures may be indicated by like or corresponding reference numerals. Moreover, the drawings and illustrations in the present application are generally not to scale and are not intended to correspond to actual relative dimensions.

FIG. 1 shows a diagram of a system for animation, according to one implantation of the present disclosure. System 100 includes input device 101, computing device 110, 3D production device 151, recording device 161, and display 191. Input device 101 may be an input device for transmitting a scene for animation to computing device 110. In some implementations, input device 101 may be a camera, such as a still camera, for capturing an image of a drawing or design for animation. In other implementations, input device 101 may be a computer running a graphic program for graphic design, drawing, or designing on a computer.

Computing device 110 is a computing system for use in creating animations. As shown in FIG. 1, computing device 110 includes processor 120 and memory 130. Processor 120 is a hardware processor, such as a central processing unit (CPU) found in computing devices. Memory 130 is a non-transitory storage device for storing computer code for execution by processor 120, and also for storing various data and parameters. As shown in FIG. 1, memory 130 includes database 131 and executable code 140. Database 131 is a database for storing data and information accessible and usable by processor 120. Executable code 140 may include one or more software modules for execution by processor 120. As shown in FIG. 1, executable code 140 includes modeling module 141 and animation module 143.

Modeling module 141 is a software module stored in memory 130 for execution by processor 120 to create three-dimensional (3D) representations of various elements of input received from input device 101. In some implementations, modeling module 141 may receive an analog input and create a digital 3D model based on the analog input. Modeling module 141 may use sequential input images to construct a 3D model of a scene. In other implementations, modeling module 141 may receive 3D input and may transfer the input for 3D production, or modeling module 141 may receive a 3D input and may convert the 3D input to a different format that may be used to create a 3D production of the scene received from input device 101. Modeling module 141 may create a 3D model of a two-dimensional (2D) scene based on multiple sequential or alternate images of the scene.

Animation module 143 is a software module stored in memory 130 for execution by processor 120 to process scene capture information for display. In some implementations, scene capture information may include a 3D virtualization of a 3D model of the scene received from input device 101. Animation module 143 may process one or more scene captures depicting a 3D reproduction of the scene received from input device 101 to create an animation for display as a cartoon, a show, or a video game. In some implementations, animation module 143 may compile scene data to create a sequential set of animation frames for display.

Three-dimensional production device 151 may be a device for creating 3D reproductions of the scene received from input device 101. In some implementations, 3D production device 151 may be an additive production device, such as a 3D printer or other device that builds up a 3D reproduction through a constructive process. In other implementations, 3D production device 151 may be a subtractive production device, such as a numerical control machining device, a computerized numeric machining device, or other device that creates a 3D reproduction by cutting to removing material through a destructive process.

Recording device 161 may be a camera, a still camera, a video camera, or a 3D scanner. Display 191 may be a television, a projection display, a computer display, a tablet display, a mobile phone display, a virtual reality display, an augmented reality display, or other display for showing animations.

FIG. 2 shows a flow chart of an exemplary method for animation, according to one implementation of the present disclosure. Flowchart 200 begins at 201 where processor 120 receives a first scene input including a plurality of scene elements from input device 101. In some implementations, the first scene input may be a photograph of a scene, such as a hand drawing, a painting, or other artistic image. In other implementations, the first scene input may be a digital image, such as a two-dimensional (2D) image, such as a 2D computer generated image or a 3D computer generated image. Computer generated images may be computer aided drafting (CAD) images, computer drawing images, or computer animation images. The first scene input may depict a plurality of scene elements creating a scene. For example, a scene depicting a city may include buildings, cars, trees, roads, and people. Scene elements may include any visible element of a scene. In other implementations, the first scene input may be a 3D scan of a 3D scene.

At 202, processor 120 creates a 3D digital representation of each of the plurality of scene elements in the first scene input. In some implementations, modeling module 141 may use information from the first scene input to create a 3D digital representation of the scene and each of the scene elements forming the first scene. The 3D digital representation may be extracted from the scene or may be included when the first scene input is a computerized image. The 3D digital representation may extract 3D information about scene elements from relative positioning in the scene, a perspective of the scene, or by comparison with one or more previous or subsequent scene inputs. For example, modeling module 141 may compare one or more scenes preceding the first scene input or one or more scenes following the first scene input. By analyzing the movement of various scene elements and the plurality of scenes relative to other scene elements, modeling module 141 may build a 3D relationship between the scene elements and a 3D digital representation of the first scene input.

In some implementations, modeling module 141 may allow a user to manipulate the 3D digital representation of the first scene input. Modeling module 141 may allow a user to manipulate elements of the 3D digital representation of the first scene input to create alternate versions of the 3D digital representation. In some implementations, the user may use the manipulation to correct scene elements of the first scene input. In other implementations, the user may manipulate the 3D digital representation to create various other scenes, such as one or more scenes preceding the first scene input or one or more scenes following the first scene input. Such manipulation or alteration may allow the user to create one or more sequential scenes in an animation. Modeling module 141 may allow the user to create a plurality of scenes in an animation from the first scene input.

At 203, processor 120 transmits the 3D digital representation of the plurality of scene elements in the first scene input for physical production. In some implementations, modeling module 141 may transmit 3D digital representations of the first scene input for physical reproduction, or modeling module 141 may transmit a 3D digital representation of the first scene input for physical reproduction. At 204, processor 120 creates a physical 3D reproduction of the plurality of scene elements in the first scene input with 3D production device 151. Three-dimensional production device 151 may be an additive production device, such as a 3D resin printer. Additive production may create a 3D reproduction of the scene elements in a constructive manner.

In other implementations, 3D printer systems are used that print other types of material. For example, 3D printer systems can be used that print wood material, print metal material including brass, aluminum, carbon fiber flakes, or other types of metal, print embedded materials, such as materials embedded in nylon, and print plastic materials, such as Acrylonitrile Butadiene Styrene (ABS) and other types of plastic material. Any suitable printing surface may be used depending on the type of material that is being printed.

In other implementations, 3D production device 151 may be a subtractive production device. Subtractive production may create a 3D representation of the scene elements in a destructive manner. A subtractive construction device may create the 3D reproduction of the scene elements by removing material from a blank. In some implementations, 3D production device 151 may include additive and subtractive production methods.

At 205, the physical 3D reproductions of the plurality of scene elements are arranged to recreate the first scene input in three dimensions. In some implementations, the scene elements may be arranged by a computerized process to recreate the first scene input in three dimensions. In other implementations, the user may arrange the scene elements to recreate the first scene input in three dimensions. In some implementations, the 3D reproduction of the first scene input may include a certain number of set scene elements that are fixed in relation to each other and some scene elements that are not fixed so they are positionable and repositionable in the first scene. The repositionable scene elements may be the scene elements that move relative to the fixed scene elements in one or more subsequent scenes. The fixed scene elements may remain in place and the repositionable scene elements may be placed to recreate the scene depicted in the first scene input. The repositionable scene elements may be repositioned in subsequent arrangements.

At 206, system 100 records a first scene capture depicting the physical 3D reproductions of the plurality of scene elements of the first scene input arranged to recreate the first scene input with recording device 161. In some implementations, recording device 161 records a 2D image of the 3D reproduction of the first scene input. In other implementations, recording device 161 records a 3D image or scan of the 3D reproduction of the first scene input. The recording may be in 2D or in 3D. The recording may be intended to be compiled with a plurality of other scene recordings to be arranged sequentially to create an animation, such as a film, a short, video game animation, virtual experience animation, or other animated cinematic production. In other implementations, the recording may be intended for use in a digitized application, such as used in a 2D or 3D video game production. The recorded scene capture may be virtualized by computer processing for creating a virtual environment that a user may interact with in an interactive environment, such as a 3D interactive video or an interactive video game. In other implementations, the interactive environment may be an augmented reality environment or a virtual reality environment. Recording device 161 may transmit the recorded scene capture depicting the physical 3D reproductions of the plurality of scene elements of the first scene input to computing device 110.

At 207, processor 120 receives the first scene capture depicting the physical 3D reproductions of the plurality of scene elements of the first scene input arranged to recreate the first scene input from recording device 161. At 208, processor 120 processes the first scene capture for display. In some implementations, processing may include creating an animation by arranging the first scene capture with a plurality of other scene captures for sequential display. In other implementations, processing may include virtualizing the first scene capture for inclusion in a video game or other virtual user experience. For example, an animation producing entity uses this process in developing a video game, motion picture, animation, or virtual experience or environment. At 209, processor 120 transmits the animation for display. At 210, system 100 displays the animation on display 191.

From the above description, it is manifest that various systems and devices can be used for implementing the systems and devices described in the present application without departing from the scope of those concepts. Moreover, while the systems and devices have been described with specific reference to certain implementations and embodiments, a person having ordinary skill in the art would recognize that changes can be made in form and detail without departing from the scope of those improvements. As such, the described implementations and embodiments are to be considered in all respects as illustrative and not restrictive. It should also be understood that the present application is not limited to the particular implementations and embodiments described above, but many rearrangements, modifications, and substitutions are possible without departing from the scope of the present disclosure.

What is claimed is:

1. A system comprising:
   a non-transitory memory storing an executable code; and
   a hardware processor executing the executable code to:
      receive a first scene input from an input device, wherein the first scene input includes first scene elements;
      create a three-dimensional (3D) digital representation of the first scene elements;
      transmit the 3D digital representation of the first scene elements for physical production;
      receive a first scene capture from a recording device, wherein the first scene capture depicts a physical 3D reproduction of the first scene elements arranged to recreate the first scene input, wherein the physical 3D reproduction of the first scene input includes a first amount of scene elements that are fixed in relation to each other and a second amount of scene elements that are not fixed and are positionable and repositionable in a first scene; and using the first scene capture in generating an animation.

2. The system of claim 1, wherein the recording device is one of a still camera, a video camera, a 3D scanner, a tactile sensor, or an auditory sensor.

3. The system of claim 1, wherein the hardware processor further executes the executable code to:

receive a second scene input including a plurality of second scene elements from the input device;

create a three-dimensional (3D) digital representation of each of the plurality of second scene elements in the second scene input;

transmit the 3D digital representation of the plurality of second scene elements in the second scene input for physical production;

receive a second scene capture depicting the physical 3D reproductions of the plurality of second scene elements of the second scene input arranged to recreate the second scene input from the recording device;

process the second scene capture for display; and transmit the second scene capture for display.

4. The system of claim 3, further comprising:

a display, wherein the hardware processor further executes the executable code to display the first scene capture and the second scene capture sequentially on the display.

5. The system of claim 3, wherein processing the first scene capture for display includes one of creating an animation by arranging the first scene capture with a plurality of other scene captures for sequential display and virtualizing the first scene capture for inclusion in a video game or other virtual user experience.

6. A system comprising:

a non-transitory memory storing an executable code; and a hardware processor executing the executable code to:

receive a first scene input from an input device, wherein the first scene input includes first scene elements;

create a three-dimensional (3D) digital representation of the first scene elements;

transmit the 3D digital representation of the first scene elements for physical production;

receive a first scene capture from a recording device, wherein the first scene capture depicts a physical 3D reproduction of the first scene elements arranged to recreate the first scene input, wherein the physical 3D reproduction of the first scene input includes a first amount of scene elements that are fixed in relation to each other and a second amount of scene elements that are not fixed and are positionable and repositionable in a first scene; and using the first scene capture in generating an animation, wherein the animation is part of a motion picture or virtual environment, and wherein the system is used by an animation producing entity in developing the motion picture or virtual environment.

7. The system of claim 6, wherein the hardware processor further executes the executable code to:

receive a second scene input including a plurality of second scene elements from the input device;

create a three-dimensional (3D) digital representation of each of the plurality of second scene elements in the second scene input;

transmit the 3D digital representation of the plurality of second scene elements in the second scene input for physical production;

receive a second scene capture depicting the physical 3D reproductions of the plurality of second scene elements of the second scene input arranged to recreate the second scene input from the recording device;

process the second scene capture for display; and transmit the second scene capture for display.

8. The system of claim 7, further comprising:

a display, wherein the hardware processor further executes the executable code to display the first scene capture and the second scene capture sequentially on the display.

9. The system of claim 6, wherein processing the first scene capture for display includes one of creating an animation by arranging the first scene capture with a plurality of other scene captures for sequential display and virtualizing the first scene capture for inclusion in a video game or other virtual user experience.

10. The system of claim 6, wherein the recording device is one of a still camera, a video camera, a 3D scanner, a tactile sensor, or an auditory sensor, and wherein the input device is one of a still camera, a video camera, and a computer running a graphics program.

11. A system comprising:

a non-transitory memory storing an executable code; and a hardware processor executing the executable code to:

receive a first scene input from an input device, wherein the first scene input includes first scene elements;

create a three-dimensional (3D) digital representation of the first scene elements;

transmit the 3D digital representation of the first scene elements for physical production;

receive a first scene capture from a recording device, wherein the first scene capture depicts a physical 3D reproduction of the first scene elements arranged to recreate the first scene input, wherein the physical 3D reproduction of the first scene input includes a first amount of scene elements that are fixed in relation to each other and a second amount of scene elements that are not fixed and are positionable and repositionable in a first scene, and wherein the physical 3D reproduction is made with additive production or subtractive production; and using the first scene capture in generating an animation.

12. The system of claim 11, wherein the hardware processor further executes the executable code to:

receive a second scene input including a plurality of second scene elements from the input device;

create a three-dimensional (3D) digital representation of each of the plurality of second scene elements in the second scene input;

transmit the 3D digital representation of the plurality of second scene elements in the second scene input for physical production;

receive a second scene capture depicting the physical 3D reproductions of the plurality of second scene elements of the second scene input arranged to recreate the second scene input from the recording device;

process the second scene capture for display; and transmit the second scene capture for display.

13. The system of claim 12, further comprising:

a display, wherein the hardware processor further executes the executable code to display the first scene capture and the second scene capture sequentially on the display.

14. The system of claim 11, wherein processing the first scene capture for display includes one of creating an animation by arranging the first scene capture with a plurality of other scene captures for sequential display and virtualizing the first scene capture for inclusion in a video game or other virtual user experience.

15. The system of claim 11, wherein the recording device is one of a still camera, a video camera, a 3D scanner, a tactile sensor, or an auditory sensor, and wherein the input device is one of a still camera, a video camera, and a computer running a graphics program.

16. The system of claim 11, wherein the input device is one of a still camera, a video camera, and a computer running a graphics program.

\* \* \* \* \*